United States Patent

Matsui

(10) Patent No.: US 10,863,113 B2
(45) Date of Patent: Dec. 8, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Taichi Matsui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/262,609

(22) Filed: Jan. 30, 2019

(65) Prior Publication Data

US 2019/0246048 A1    Aug. 8, 2019

(30) Foreign Application Priority Data

Feb. 5, 2018  (JP) ................. 2018-018206

(51) Int. Cl.
*H04N 5/272* (2006.01)
*H04N 5/14* (2006.01)

(52) U.S. Cl.
CPC ............. *H04N 5/272* (2013.01); *H04N 5/144* (2013.01)

(58) Field of Classification Search
CPC ............................ H04N 5/272; H04N 5/144
See application file for complete search history.

(56) References Cited

U.S. PATENT DOCUMENTS

| | | | | |
|---|---|---|---|---|
| 2008/0129844 A1* | 6/2008 | Cusack | ................. | H04N 5/232 348/241 |
| 2008/0180539 A1* | 7/2008 | Jung | .................... | G11B 27/034 348/222.1 |
| 2008/0231729 A1* | 9/2008 | Sato | ...................... | G06T 3/4053 348/229.1 |
| 2009/0066782 A1* | 3/2009 | Choi | ...................... | H04N 3/155 348/25 |
| 2010/0067741 A1* | 3/2010 | Stolkin | ................ | G06K 9/3241 382/103 |
| 2010/0119157 A1* | 5/2010 | Kameyama | .......... | H04N 19/115 382/195 |
| 2010/0128983 A1* | 5/2010 | Sugai | ................... | G06K 9/3216 382/173 |
| 2011/0123068 A1* | 5/2011 | Miksa | ..................... | G06T 5/002 382/105 |
| 2012/0176505 A1* | 7/2012 | Kim | ................... | H04N 5/23219 348/222.1 |
| 2013/0108105 A1* | 5/2013 | Yoo | ........................ | H04N 5/272 382/103 |
| 2016/0171332 A1* | 6/2016 | Kawano | .................. | G06T 7/254 382/173 |
| 2016/0309096 A1* | 10/2016 | Hagisu | ............... | G06K 9/00342 |
| 2016/0366326 A1* | 12/2016 | Sen | ......................... | G06T 7/215 |
| 2019/0147598 A1* | 5/2019 | Sawai | ..................... | G06T 7/194 382/283 |
| 2019/0236791 A1* | 8/2019 | Matsui | .................... | G06T 7/215 |

FOREIGN PATENT DOCUMENTS

JP         2016-115214 A       6/2016

* cited by examiner

*Primary Examiner* — Timothy J Henn
(74) *Attorney, Agent, or Firm* — Canon U.S.A., Inc. IP Division

(57) ABSTRACT

An image processing apparatus extracts a plurality of features from an input image, sets a background integration time for each of the plurality of extracted features, and updates a background image based on the background integration times corresponding to the plurality of extracted features.

12 Claims, 7 Drawing Sheets

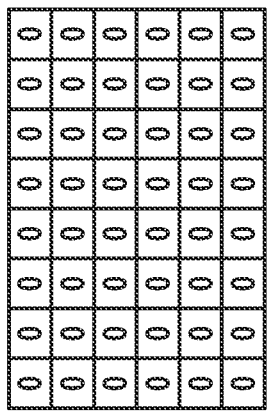
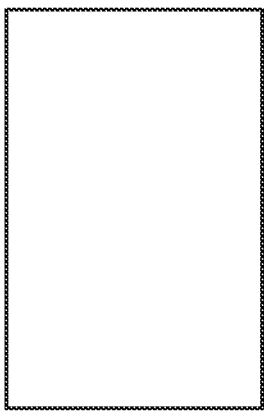
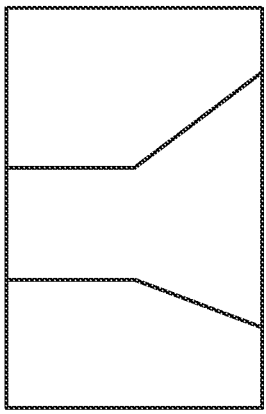
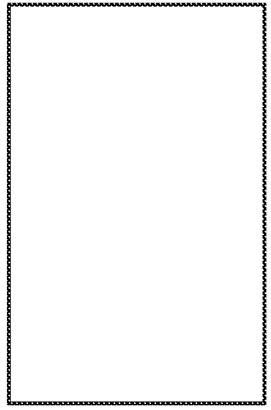
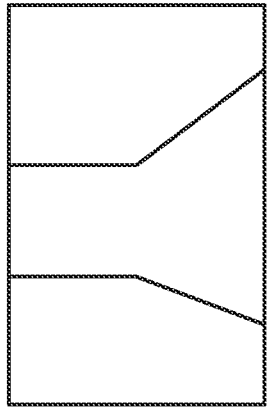
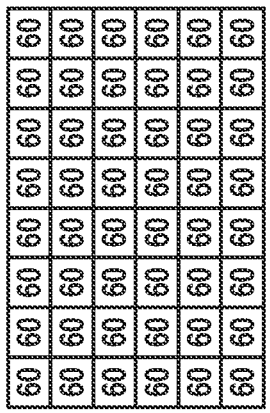
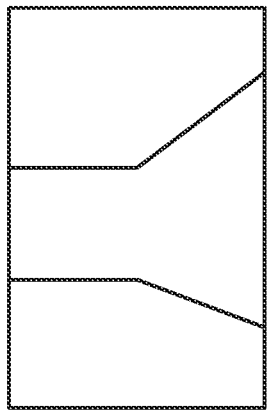

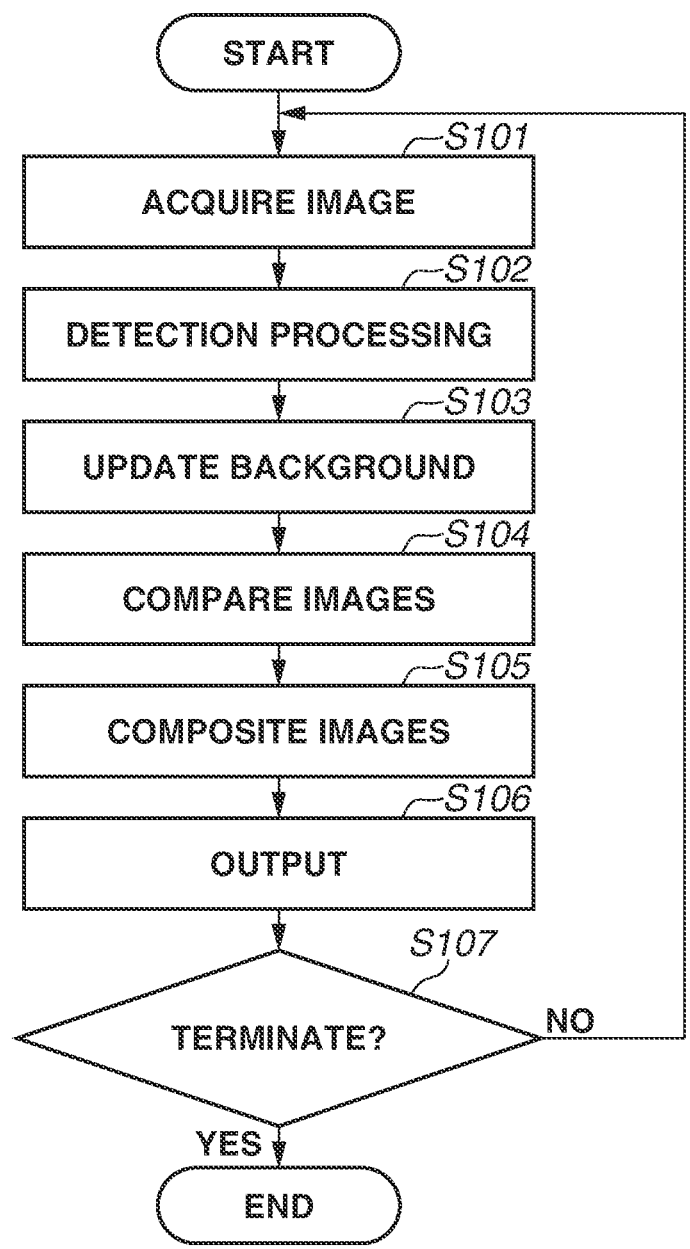

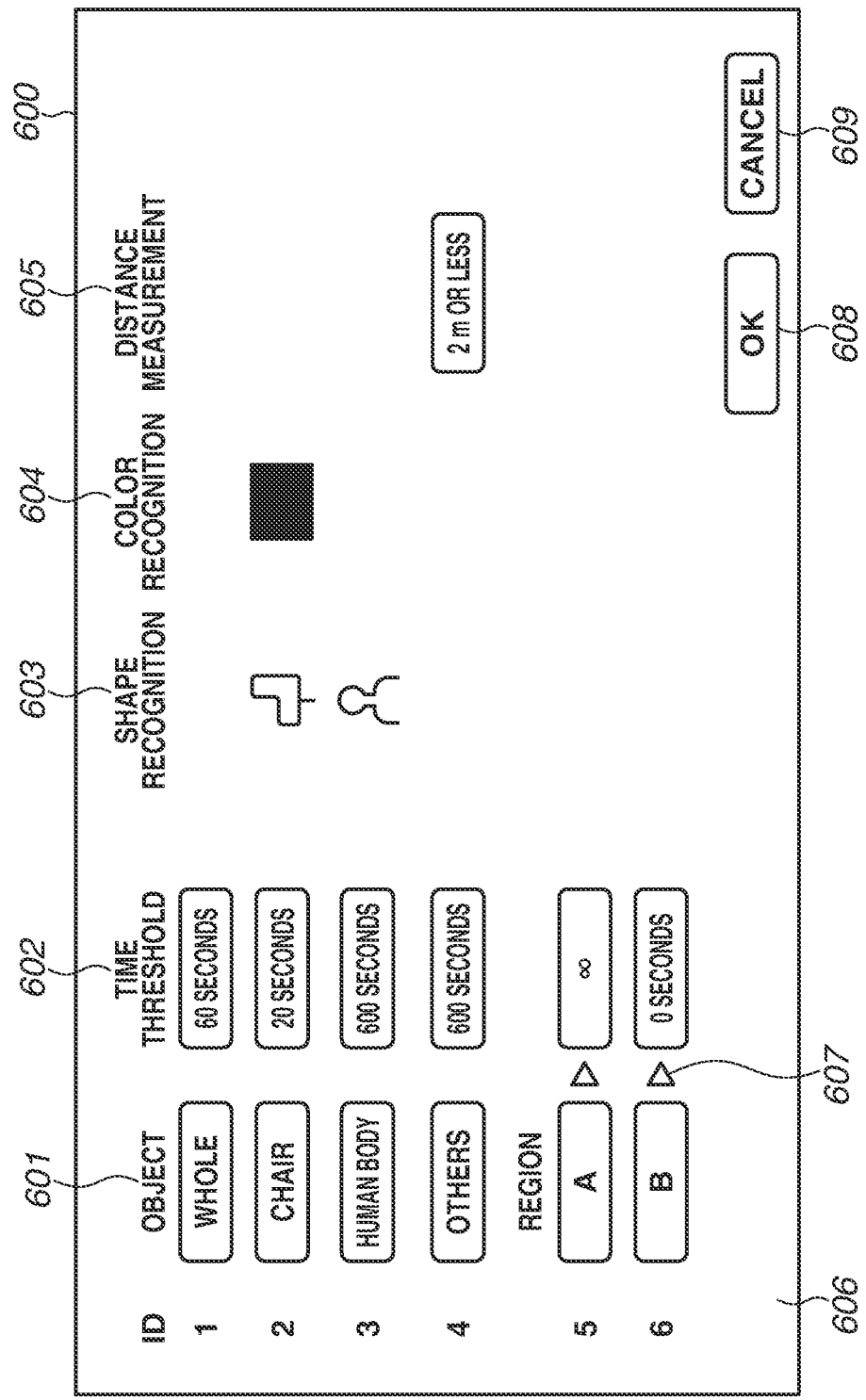

FIG.7

BACKGROUND IMAGE (1)
- ☐ ARBITRARY IMAGE  [SET]   [THUMBNAIL]
- ☑ AUTOMATICALLY UPDATE   ☐ OPTION TO DETECT HUMAN BODY
- ○ CAPTURED IMAGE
- ☑ RECORDED IMAGE   START [00:00] (hh:mm)   LENGTH [00:00] (hh:mm)

⎫ 701

BACKGROUND IMAGE (2) (FOR PROTECTION IMAGE)
- ☐ ARBITRARY IMAGE  [SET]   [THUMBNAIL]   [ ]   [ ]
  [SET LIVE IMAGE]              00:00     --:--   --:--
- ☐ USE BACKGROUND IMAGE (1)

⎫ 702

REGION SETTING
- BACKGROUND IMAGE (1) [SET]

⎫ 703

COMMON
- CAMERA FOR WHICH SETTING SHOULD BE REFLECTED  [SET]
- FILE OUTPUT INTERVAL [5 SECONDS]   UPPER LIMIT OF NUMBER OF FILES [0] (1-60480)

⎫ 704

[OK]  [CANCEL]

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium, and in particular, to a technique for protecting privacy by hiding a specific object in an image.

Description of the Related Art

In recent years, installation of monitoring cameras in town has progressed. In such circumstances, the importance of protecting privacy of individuals on monitoring cameras is increasing. For example, Japanese Patent Application Laid-Open No. 2016-115214 discusses a method of comparing a background image and an image to be processed and of performing concealment processing on a specific region of the image to be processed according to the comparison result to protect privacy. In particular, human bodies and moving objects displayed on the image are detected to improve accuracy of concealment processing.

However, in Japanese Patent Application Laid-Open No. 2016-115214, a background of a region other than human bodies and moving objects in an image is updated at a fixed time interval, and processing for preferably protecting privacy of a target or a region that should be immediately integrated with the background has not been possible.

SUMMARY OF THE INVENTION

The following exemplary embodiment provides an image processing apparatus that can set a background integration time suitable for each of imaged objects some of which are privacy protection targets and others of which are not.

According to an aspect of the present disclosure, an image processing apparatus that protects privacy by composing an anonymized foreground image with a background image includes an extraction unit configured to extract a plurality of features from an input image, a setting unit configured to set a background integration time for each of the plurality of features extracted by the extraction unit, and an updating unit configured to update the background image based on the background integration times corresponding to the plurality of features extracted by the extraction unit.

Further features of the present disclosure will become apparent from the following description of exemplary embodiments with reference to the attached drawings.

BRIEF DESCRIPTION OF THE DRAWINGS

FIGS. 3A, 3B, 3C, 3D, 3E, 3F, and 3G are schematic diagrams for describing an outline of privacy protection processing.

FIG. 5 is a flowchart illustrating an outline of privacy protection processing.

FIG. 6 is a schematic diagram illustrating a graphic user interface (GUI) for setting a time threshold value.

FIG. 7 is a schematic diagram illustrating a GUI for setting a background image.

DESCRIPTION OF THE EMBODIMENTS

Figure 1A:
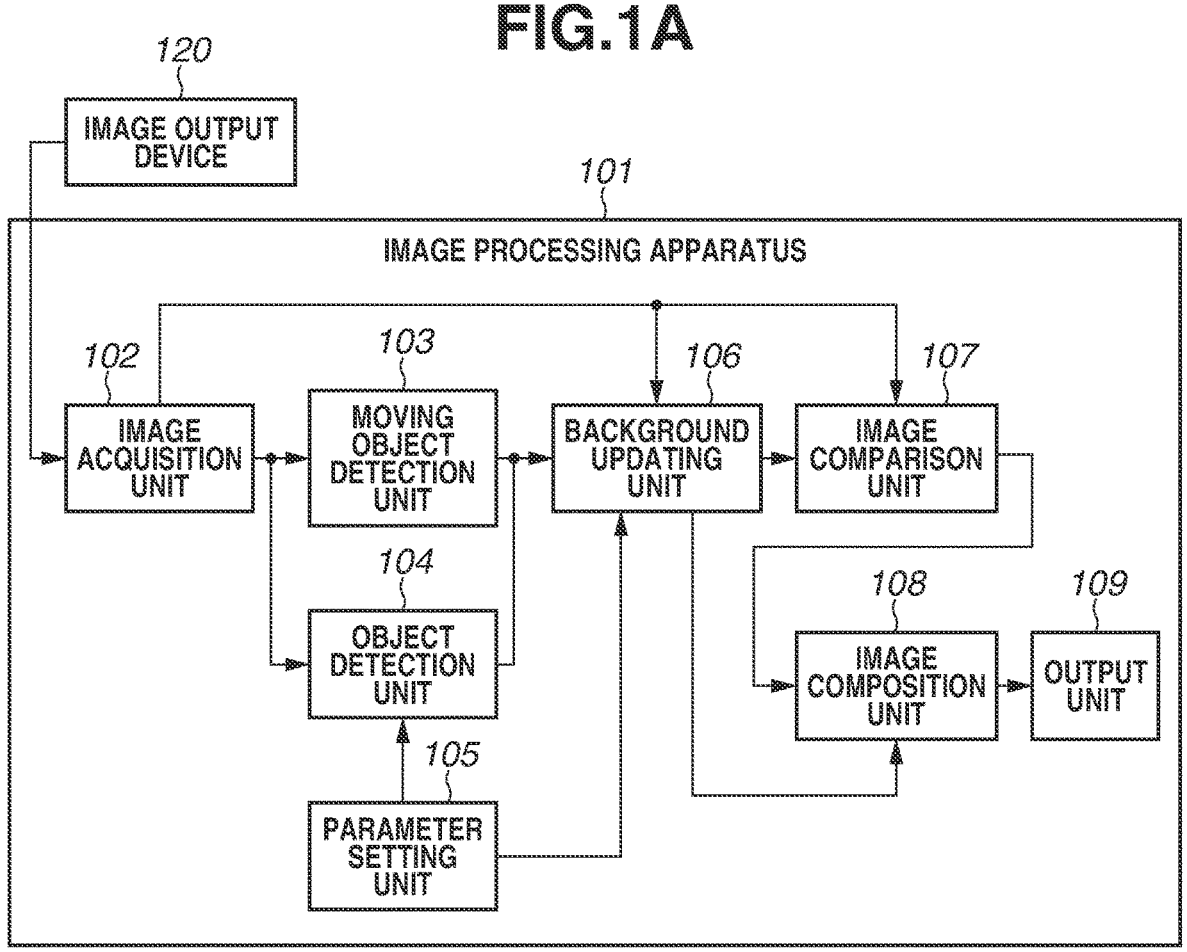
FIG. 1A is a block diagram illustrating a functional configuration of an image processing apparatus.

Hereinafter, exemplary embodiments will be described in detail with reference to the accompanying drawings. Configurations described in the following exemplary embodiments are merely examples, and the present disclosure is not limited to the configurations illustrated in the drawings.

Figure 1B:
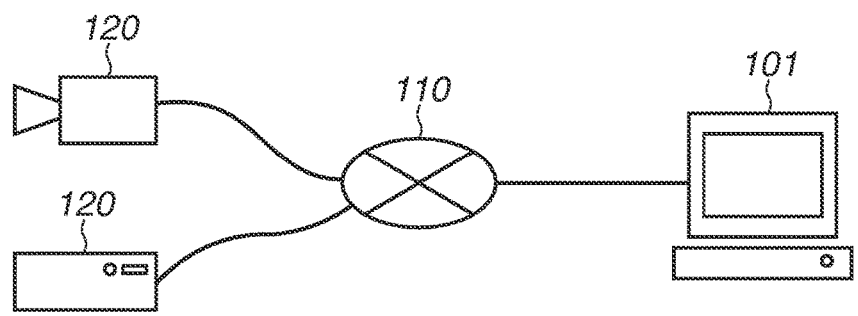
FIG. 1B is a schematic diagram illustrating a schematic configuration of an image processing system.

FIG. 1B is a schematic diagram illustrating an image processing system of the present exemplary embodiment. At least one or more image output devices 120 are communicably connected to an image processing apparatus 101 via a network 110. The image output device 120 can be a network camera or a Network Video Recorder (NVR) for monitoring purpose. In the following description, a network camera (simply referred to as a camera 120) will be described as an example. The network 110 transmits a distributed video from the camera 120 to the image processing apparatus 101 by communication conforming to the Internet protocol, and transmits a control signal or a setting parameter of the camera 120 from the image processing apparatus 101 to the camera 120. The image processing apparatus 101 acquires moving image data from the image output device 120 and performs privacy protection processing on the acquired moving image data. The image data (moving image data) on which the privacy protection processing has been performed can be output to another client apparatus connected to the network 110, displayed on a display locally connected to the image processing apparatus, or recorded in the NVR 120.

Figure 2:
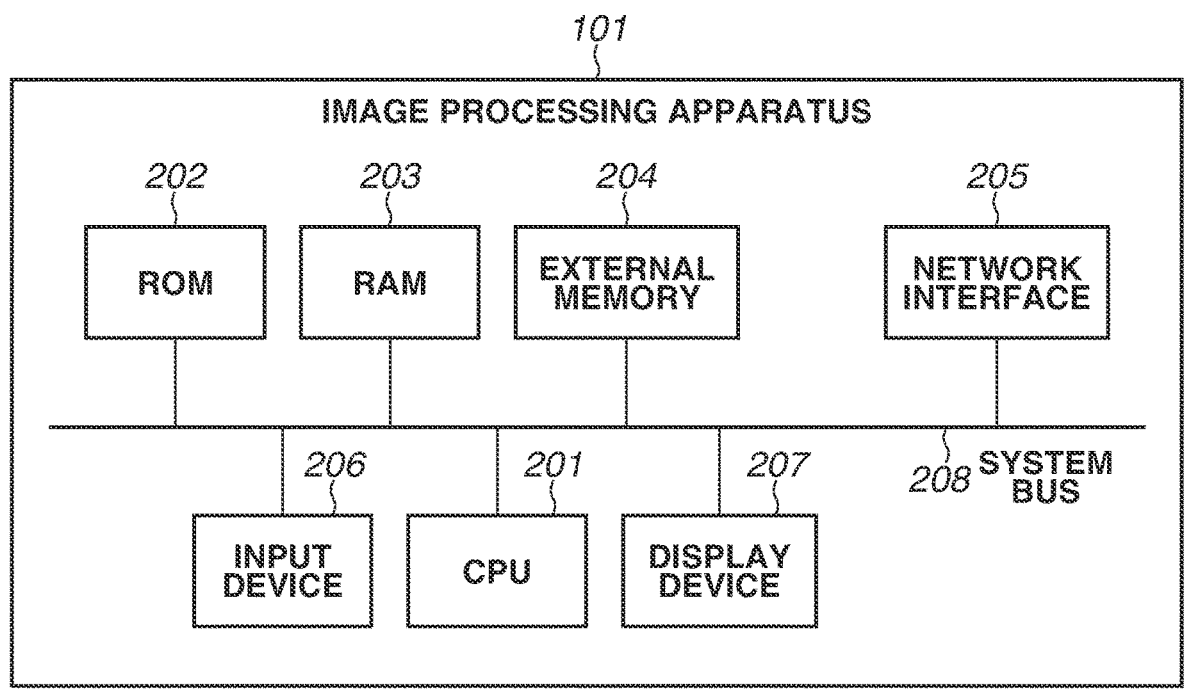
FIG. 2 is a block diagram illustrating a hardware configuration of the image processing apparatus.

FIG. 2 is a block diagram illustrating a hardware configuration of the image processing apparatus 101. The image processing apparatus 101 includes components of a central processing unit (CPU) 201, a read only memory (ROM) 202, a random access memory (RAM) 203, an external memory 204, a network interface 205, an input device 206, a display device 207, and a system bus 208.

The CPU 201 comprehensively controls an operation of the image processing apparatus 101, and controls each of the components (202 to 207) via the system bus 208. The ROM 202 is a nonvolatile memory that stores control programs and the like necessary for the CPU 201 to perform processing. A program executed by the CPU 201 can be stored in the external memory 204 or a detachable storage medium.

The RAM 203 functions as a main memory and a work area of the CPU 201. In other words, the CPU 201 loads necessary programs and the like from the ROM 202 into the RAM 203 at the time of performing processing to be described below, and implements various functional operations by executing the read programs.

The external memory 204 stores, for example, various types of data and various types of information necessary for the CPU 201 to perform processing using the programs. In addition, the external memory 204 stores, for example, various types of data and various types of information acquired by the CPU 201 performing processing using the programs or the like.

The network interface 205 is an interface for communicating with an external apparatus. The network interface 205 is, for example, a local area network (LAN) interface. In the present exemplary embodiment, an example in a case where the image processing apparatus 101 is a client personal computer (PC) will be mainly described.

The input device 206 functions as an input device to the CPU 201. The input device 206 is, for example, a keyboard, a mouse, or a button.

The display device 207 is a display that displays the output of the CPU 201. In some cases, videos are output to the outside through the network interface 205. Thus, the display device 207 can be unnecessary depending on the configuration.

The image output device 120 has a configuration similar to that illustrated in FIG. 2. In a case where the image output device 120 is a network camera, the image output device 120 does not include the display device 207, but includes an image sensor, a lens, and a processor (not illustrated) for image processing. The lens can be a detachable lens.

FIG. 1A illustrates a schematic configuration of the image processing apparatus 101, and the image processing apparatus 101 includes an image acquisition unit 102, a moving object detection unit 103, an object detection unit 104, a parameter setting unit 105, a background updating unit 106, an image comparison unit 107, an image composition unit 108, and an output unit 109.

The image acquisition unit 102 sequentially acquires images at predetermined intervals from the image output device 120, and transmits the acquired images to the moving object detection unit 103, the object detection unit 104, the background updating unit 106, and the image comparison unit 107.

The moving object detection unit 103 detects a moving object by comparing the images acquired from the image acquisition unit 102 and a background image, i.e., a background model (background subtraction method). In other words, the moving object detection unit 103 detects a moving object region based on comparison between an acquired image by the image acquisition unit 102 and another image that was captured at a time different from the time at which the acquired image was captured. The background model is appropriately updated by the moving object detection unit 103 following the change in the images, and can be a feature (information obtained by extracting a luminance component or the like of each pixel) instead of an image.

The moving object detection unit 103 transmits moving object information obtained by moving object detection processing to the background updating unit 106. The moving object information of the present exemplary embodiment includes information on center coordinates (position information) and a circumscribed rectangle (shape information) of the moving object detected from the image. The moving object detection unit 103 performs moving image detection processing on each of a plurality of images acquired by the image acquisition unit 102 and transmits moving object information obtained as a result of the moving image detection processing to the background updating unit 106.

The object detection unit 104 performs object detection processing for detecting a specific object from the image acquired by the image acquisition unit 102. The object detection unit 104 according to the present exemplary embodiment performs the object detection processing on the image acquired by the image acquisition unit 102 using a method described below.

First, a pattern matching method is used. The object detection unit 104 detects an object by comparing the image acquired by the image acquisition unit 102 with a predetermined pattern image (or feature). Any object having a pattern image that can be detected, such as a human body, a chair, and a desk can be a detection target. The human body can be a whole body or a part of the whole body such as an upper body, a head, a face, or a hand. However, the object detection method is not limited to the pattern matching method, and detection based on color, brightness, density gradient, texture, and feature amount of machine learning of an image can be used.

Secondly, distance detection is used. It is known that there is a camera that can detect a distance from a camera image (acquire a distance by a triangulation method using two pixels of pixels of a twin-lens camera or a Charge Coupled Device (CCD) camera) at the present time. The object detection unit 104 measures a distance for each region from the image acquired by the image acquisition unit 102. The object detection unit 104 performs object detection as follows based on the distance. The object detection unit 104 detects a region at a distance greater than or equal to a predetermined distance not as a privacy protection target but as a region to be a background. If a region is at a distance less than the distance that was detected previously by a predetermined distance or more, a human body may have entered the region. Thus, the object detection unit 104 detects the region as a privacy protection target.

The object detection unit 104 calculates a score for each region based on the feature amounts (features) of the image regions detected by the first method and the second method. For a region that was detected as a region requiring privacy protection, such as a human body region, a score is set to be high, while, for a region that was detected as an object that does not require privacy detection, such as a distant view or a desk, a score is set to be low. The score is calculated taking into account more certainty, and if it is determined that the region is more likely that the privacy protection is necessary, a higher score is set, while, if it is determined that the region is more likely that the privacy protection is less necessary, a lower score is set.

The object detection unit 104 transmits such score information calculated for each region by the above-described method to the background updating unit 106.

The background updating unit 106 generates a background image based on the image acquired by the image acquisition unit 102, the moving object information acquired from the moving object detection unit 103, and the score information of the image region acquired from the object detection unit 104. The background updating unit 106 then transmits the background image to the image comparison unit 107 and the image composition unit 108. Details of background image generation processing performed by the background updating unit 106 will be described below.

The image comparison unit 107 composes a predetermined image with a protection region indicated by protection region information acquired from the image comparison unit 107 out of the background image acquired from the background updating unit 106 to generate a protection image. The protection image is an image in which privacy is protected as compared with the input image before the processing, and the details of a method to generate the protection image will be described below. The image composition unit 108 transmits the generated protection image to the output unit 109.

The output unit 109 causes the protection image acquired from the image composition unit 108 to be displayed. In a case where the image processing apparatus 101 is mounted on a network camera, the output unit 109 can transmit the protection image to a monitor apparatus connected via the network camera. In a case where the image processing apparatus 101 is mounted on a monitor apparatus, the image processing apparatus 101 generates the protection image by composing a predetermined image with the background image acquired from a network camera, and causes the monitor apparatus to display the generated protection image. The parameter setting unit 105 sets a parameter necessary for object detection by the object detection unit 104 (details will be described below with reference to FIG. 6).

A method of generating the background image performed by the background updating unit 106 will be described. The background updating unit 106 manages a stable background integration time for each region (block) obtained by dividing a background image by a predetermined size. The stable background integration time is set for each image region based on the moving object information and the score information of the image region, and corresponds to the background integration of an object in the image region.

In the following description, the generation processing of the background image performed by the background updating unit 106 will be described for two cases of (A) first image and (B) image after the first image.

(A) Generation Processing of a Background Image for the First Time (background image to be generated for the first time after activation of the apparatus, change of imaging condition, or the like)

In this case where a background image has not been generated yet, the background updating unit 106 stores an image acquired from the image acquisition unit 102 as a background image. The background updating unit 106 sets 0 as the stable background integration time for all blocks of the background image.

(B) Generation Processing of a Background Image After the First Image

In this case where the first image is set as the background image and a background image is generated thereafter, the background updating unit 106 updates (increments) the stable background integration time corresponding to blocks other than blocks that include the moving object region specified by the moving object information. The background updating unit 106 then specifies a block corresponding to a stable background integration time that becomes longer than or equal to a time threshold value, and updates the background image based on a pixel value of a region corresponding to the specified block of an image newly acquired by the image acquisition unit 102. Here, the block corresponding to a stable background integration time that becomes longer than or equal to the time threshold value means a region in which a moving object undetected state continues for the time threshold value. The background updating unit 106 then sets the stable background integration time corresponding to the block used for updating the background image to 0.

The background updating unit 106 sets a time threshold value for each image region based on the score information of the image area. A higher score indicates higher necessity of privacy protection, and a lower score indicates lower necessity of privacy protection. As the score is higher, the background updating unit 106 sets a longer time as a time threshold value, so that it is less likely to compose the image with the background image (background integration becomes less likely). On the other hand, as the score is lower, the background updating unit 106 sets a shorter time as the time threshold value, so that it is more likely to compose the image with the background image in a shorter time (background integration becomes more likely). The background updating unit 106 sets a score of the degree of privacy protection corresponding to the feature amount of an object in the image region and sets a time threshold value suitable for the situation. The time threshold value can also be referred to as the background integration time.

Objects having a high degree of necessity of privacy protection include a human body and an object with confidential information printed thereon. Objects having a low degree of necessity of privacy protection and being movable include a chair and a clock. For example, the background updating unit 106 sets the stable background integration time corresponding to an image region having the maximum score to infinity. For example, the background updating unit 106 sets the stable background integration time corresponding to an image region having the minimum score to 0. For example, the background updating unit 106 sets the maximum score to an image region that was detected as a human body. For example, the background updating unit 106 sets the minimum score to an image region that was detected as a chair or a clock.

Figure 4C:
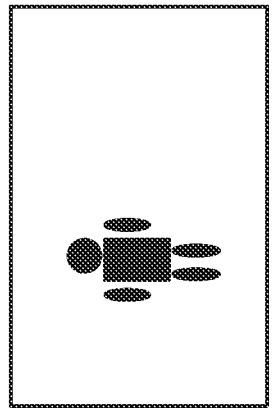
FIGS. 4A, 4B, 4C, 4D, 4E, 4F, and 4G are schematic diagrams for describing an example of the privacy protection processing.

Details of the processing in the case (B) will be described with reference to FIGS. 3A to 3G and FIGS. 4A to 4G. FIGS. 3A and 4A are images acquired from the image acquisition unit 102 (acquired images), and FIGS. 3B and 4B illustrate results (recognition results) obtained by rendering the moving object information and the object information on a white image having the same size as the image. FIGS. 3C and 4C illustrate stable background integration times, FIGS. 3D and 4D illustrate time threshold values, and FIGS. 3E and 4E illustrate updated background images.

FIGS. 3A to 3G illustrate states at a timing when acquisition processing of the background image according to the present exemplary embodiment starts. FIGS. 3A to 3G correspond to the above-described case (A). Typically, the case (A) corresponds to a timing at which the image processing apparatus 101 starts generating a background image or timing immediately after the existing background image is reset. As described above, since the background updating unit 106 of the present exemplary embodiment stores the image acquired from the image acquisition unit 102 as it is as the background image in the case (A), the acquired image of FIG. 3A and the background image of FIG. 3E are the same. In addition, as illustrated in FIG. 3B, no moving object or object is detected in this example. It is desirable that the initial background image does not include a foreground.

FIGS. 4A to 4G illustrate a state after a certain time has elapsed from the state of FIGS. 3A to 3G, and it is assumed that the background image illustrated in FIG. 3E is set. In the acquired image illustrated in FIG. 4A, there are a human FIG. 401 and a chair 402. FIG. 4B illustrates that a moving object 403 is detected by the moving object detection processing of the moving object detection unit 103, and an object 404 and an object 405 are detected by the object detection processing of the object detection unit 104.

FIG. 4C illustrates that, for blocks including the moving object region having been detected by the moving object detection processing, the stable background integration time is set to 0 (reset). As illustrated in FIG. 4C, the stable background integration times for blocks that do not include the moving object region are incremented at regular time intervals and have been increased to 9 from the initial value 0.

FIG. 4D illustrates time threshold values set based on scores calculated from the moving object information detected by the object detection processing. In the present exemplary embodiment, the standard time threshold value is set to 60. Since the object 404 was determined as a human body and the maximum value of the score was set, the time threshold values of the region where the object 404 is located are set to ∞ (infinity). On the other hand, since the object 405 was determined as a chair and a score lower than the standard was set, the time threshold values of the region where the object 405 is located are set to 9.

FIG. 4E illustrates the background image updated based on the comparison result of the stable background integration times illustrated in FIG. 4C and the time threshold values. Since the stable background integration times of the region of the chair 402 is 9 and reach the time threshold values 9 of the region, a partial image of the chair region is composed as a background image (integrated with background). Since the stable background integration times of other region do not reach the time threshold values, the previous background image (FIG. 3E) remains.

A method of generating protection region information performed by the image comparison unit 107 will be described. The protection region information is information indicating a position and a shape of a protection target in an image. In the present exemplary embodiment, a region requiring privacy protection is defined as a protection region.

The image comparison unit 107 extracts luminance components from an acquired image acquired from the image acquisition unit 102 to generate a luminance image and a luminance image as well from a background image acquired from the background updating unit 106. The image comparison unit 107 generates a difference image constituted of absolute values of differences by a pixel unit (each pixel) between the luminance image based on the acquired image and the luminance image based on the background image. The image comparison unit 107 determines a pixel having a difference value greater than a predetermined threshold value among the pixels of the difference image as a pixel to be protected. The image comparison unit 107 then connects adjacent pixels to be protected, specifies a region larger than or equal to a certain area (the number of pixels) as a protection area, and generates protection region information indicating the position and the shape of the protection region.

Figure 4F:
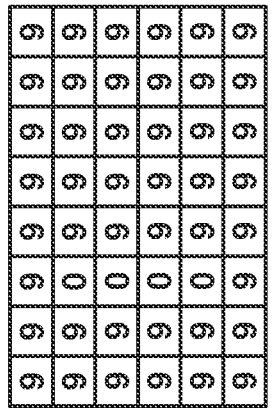
Figure 4B:
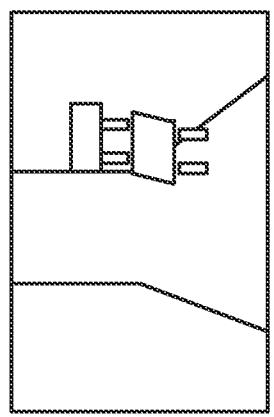
Figure 4E:
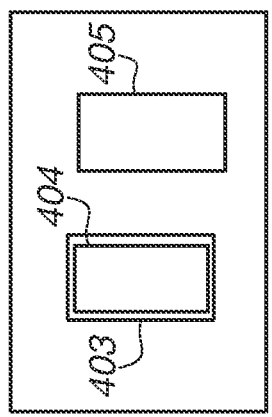
Figure 4A:
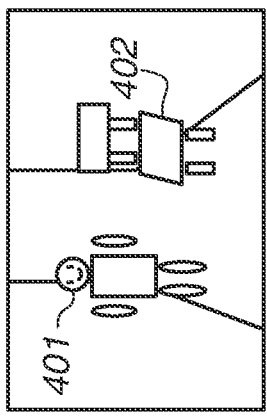
Figure 4D:
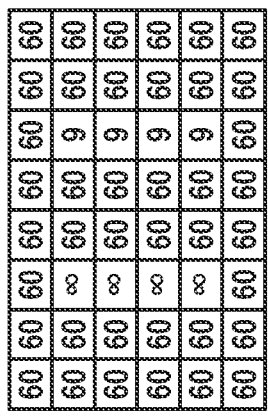

FIGS. 3F and 4F illustrate the protection region corresponding to the protection region information generated based on the background images of FIGS. 3E and 4E and the acquired images of FIGS. 3A and 4A. FIG. 3F illustrates that there is no protection region, and FIG. 4F illustrates that the region corresponding to the human FIG. 401 is a protection region requiring privacy protection. The image composition unit 108 generates a protection image obtained by composing a predetermined image with the protection region indicated by the protection region information of the background image. Here, the predetermined image is a silhouette image generated, for example, by filling the protection region corresponding to the position and the shape specified by the protection region information with a single color image to improve anonymity (anonymized). That is, the image composition unit 108 performs image processing to make a region (protection region) specified based on the comparison of the acquired image to be processed and the background image after generation of the background image (after updating) as a protection image (concealment image), which is also called "silhouette".

Figure 4G:
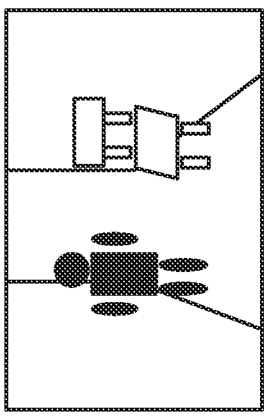

FIGS. 3G and 4G are protection images generated by the image composition unit 108 based on the background images of FIGS. 3E and 4E and the protection region information of FIGS. 3F and 4F. As illustrated in FIG. 4F, the chair to be integrated with background quickly is in the background and the actual object is visible, and whole (or part) of the human body including its face requiring privacy protection is, for example, concealed to anonymize the individual to disable determination of the individual.

A processing flow of the image processing apparatus 101 of the present exemplary embodiment will be described. FIG. 5 is a flowchart for describing an operation of the image processing apparatus 101 of the present exemplary embodiment. The CPU 201 of the image processing apparatus 101 realizes the processing of FIG. 5 by reading a program related to the processing in FIG. 5 from the ROM 202 or the RAM 203 and executing the program. The image processing apparatus 101 of the present exemplary embodiment starts the processing of FIG. 5 in response to an instruction by a user to start privacy protection processing. However, the start timing of the processing of FIG. 5 is not limited to the example described above. For example, for an image of an exhibition, the processing can be triggered at a predetermined time (Very Important Person (VIP) time) in a case where the timing at which the important person is captured or the like is known in advance. For an image of a station yard or a shop, the processing can be triggered at the start of business hours.

In step S101, the image acquisition unit 102 acquires an image transmitted from the image output device 120 via the network 110. In a case where the image output device 120 is an image capturing device, a captured image is acquired in real time, while in a case where the image output device 120 is a recording device, a recorded image (recorded video) that has been recorded is acquired. Other methods of acquiring the image can be used, and in a case where the image is compressed by a known encoding method such as H.264, Joint Photographic Experts Group (JPEG), High Efficiency Video Coding (HEVC), or High Efficiency Image File Format (HEIF), the image acquisition unit 102 can decode the image.

In step S102, the moving object detection unit 103 performs the moving object detection processing on the image acquired by the image acquisition unit 102 (acquired image) using a background difference method based on the background image held in the RAM 203, and the object detection unit 104 performs the object detection processing based on the feature amount in the image. That is, the moving object detection unit 103 detects a moving object region (a foreground region) based on a difference between images (an acquired image and a background image), and transmits moving object information (central coordinates (position information) and a circumscribed rectangle (shape information)) to the background updating unit 106. The object detection unit 104 detects an object region based on the feature in the image, and transmits object information (central coordinates (position information), a circumscribed rectangle (shape information) of the object, and a score) to the background updating unit 106.

In step S103, the background updating unit 106 performs updating processing (generation processing) of the background image based on the moving object information and the object information. More specifically, the background updating unit 106 sets a corresponding time threshold value to blocks that have been newly detected as an object region, increments the values of stable background integration times for blocks that have not been detected as an object region at regular time intervals. The background updating unit 106 updates the background image by replacing a pixel value corresponding to the position of a block using a partial image corresponding to the position of the block for which the value of the stable background integration time is longer than or equal to the time threshold value as a result of the increment. Alternatively, the update can be performed by composing the pixel value at a predetermined ratio with the pixel value of the background image (for example, 40% of the background image and 60% of the partial image of the acquired image). The background updating unit 106 then stores the updated background image in the RAM 203 and transmits the updated background image to the image comparison unit 107. In the present exemplary embodiment, an example of managing the stable background integration time for each block is mainly described. The block can have any size and any shape.

In step S104, the image comparison unit 107 generates protection region information based on comparison between the acquired image acquired from the image acquisition unit 102 and the background image acquired from the background updating unit 106. The image comparison unit 107 then transmits the generated protection region information to the image composition unit 108.

In step S105, the image composition unit 108 generates a protection image based on the background image acquired from the background updating unit 106 and the protection region information acquired from the image comparison unit 107. More specifically, the image composition unit 108 performs concealment processing on the partial image at the position corresponding to the protection region indicated by the protection region information out of the acquired image (captured image or recorded image). The image composition unit 108 then composes the image after the concealment processing (mask image or silhouette image) with the background image to generate a protection image. The image composition unit 108 causes the generated protection image to be displayed on the display or outputs the protection image to another external apparatus via the output unit 109.

In step S106, the output unit 109 causes, for example, the protection image to be displayed. That is, after the generation (update) of the background image, the output unit 109 causes the protection image, in which the protection region (specific region) according to the comparison between the acquired image (image to be processed) and the background image is replaced with a concealment image, to be displayed. For example, in a case where the image processing apparatus 101 is a PC, the protection image is displayed on the display.

In step S107, it is determined whether to continue or terminate the processing of FIG. 5 upon completion of the processing of step S106. In a case where it is determined to continue the processing (NO in step S107), the processing returns to step S101.

FIG. 6 is an example of a graphical user interface (GUI) that operates as the parameter setting unit 105 of the present exemplary embodiment. The GUI is realized by the CPU 201 of the image processing apparatus 101 reading a predetermined program from the RAM 203 and displaying it on the display device 207. A window 600 is a GUI (accepting unit) for accepting an instruction from a user to set a parameter for the object detection unit 104 to perform the detection processing. A user can set a time threshold value (background integration time) for each object or for each feature. The conditions of columns 601 to 605 arranged next to an identifier (ID) 606 constitute an AND condition (a condition satisfied when all of the conditions of the columns 601 to 605 are satisfied). The column 601 indicates a type of a setting target object or a region identifier, and a user can select a condition by pull-down or free text input. The column 602 indicates a time threshold value (a threshold value used for determining whether to integrate the object with background) corresponding to the type of the object or the region identifier set in the column 601.

In the column 603, a user can set whether shape recognition is to be performed and a pattern image to be used for pattern matching for shape recognition. When a user clicks on the blank space, the user can refer to a file held in the image processing apparatus 101 or externally, or the user can draw and set a substantial pattern. In the column 604, a user can set whether color recognition is to be performed and set a pixel value (for example, a red, green, and blue (RGB) pixel value) to be used for color recognition. When a user clicks on a blank space, the user can display a color pallet (not illustrated) or activate an eyedropper for specifying a color in the image (captured image or recorded image) acquired by the image acquisition unit 102. In the column 605, a user can set whether distance measurement is to be performed and set a distance to be used therefor.

The ID 606 is a unique value for each entry related to the time threshold value. In the present exemplary embodiment, a condition having a greater ID is prioritized over a condition having a smaller ID. When a user presses a button 607, the image (captured image or recorded image) acquired by the image acquisition unit 102 is displayed in a window started separately. In the image, the user can set the position and the size of a region for which a time threshold value is set using a rectangular drawing tool (the drag start position and the drag end position by a mouse are defined as an upper left and a lower right respectively).

When a user presses an OK button 608, the parameter setting unit 105 sets the contents set in the window 600 as parameters in the object detection unit 104 or the background updating unit 106 (the user can discard the condition by pressing a cancel button 609). Details of the parameters set by the parameter setting unit 105 include parameters for the object detection unit 104 to perform the detection processing (a shape pattern, a color, and a distance to be detected), and parameters for the background updating unit 106 to update the background (a time threshold value and a block to be updated).

Here, supplementary explanation of each setting parameter of FIG. 6 will be given. In the condition having "6" as the ID 606, the time threshold value is set to 0 for a region B. In the image region for which the time threshold value is set to "0 SECONDS", the background image and the comparison image always match. Thus, the region will not be set as a protection region (the region will not be silhouetted). For example, for a captured image obtained by a monitoring camera installed in a station yard capturing at a field angle including a railroad, it is necessary to emphasize safety over privacy, so this setting should be used.

In the condition having "5" as the ID 606, the time threshold value is set to "INFINITY (SECONDS)", so the image region is always set as a protection region (the region is silhouetted). In the condition having "4" as the ID 606, the time threshold value is set to "600 SECONDS" because it is assumed that the degree of privacy protection for the subject at the distance of 2 m or less is high. In the condition having "3" as the ID 606, the time threshold value is set to "600 SECONDS" for a region detected by pattern matching based on the "shape feature of upper body" because the image is a "HUMAN BODY" and is an object for which the degree of privacy protection is high. In the condition having "2" as the ID 606, the time threshold value is set to "20 SECONDS" for a region detected based on the color "BLACK" and "SHAPE FEATURE OF UPPER CHAIR" because the image is a "CHAIR" and is an object for which the degree of privacy protection is low. Other than a chair, this condition can be similarly set for a desk, equipment of a conference room, and the like. In the condition having "1" as the ID 606, the time threshold value is set to a standard time threshold value "60 SECONDS" for regions that do not satisfy the other conditions having "2" to "6" as the ID 606.

As described above, according to the present exemplary embodiment, the image processing apparatus 101 generates and updates a background image using the plurality of detection units (the moving object detection unit 103 and the object detection unit 104). At that time, the time threshold value for background integration can be set for each feature of an object. Thus, privacy can be more easily protected by setting whether an object is a privacy protection target for each feature of the object. Specifically, a privacy protection target is hardly included in a background image and an object that is not a protection target is easily included in a protection image.

The window 600 of FIG. 6 can be configured to allow switching among the following three patterns of setting for a region for which "0" is set to the time threshold value as the condition having "6" as the ID in FIG. 6. The first pattern is setting to "display the present background image without change". When this pattern is set, the captured image or the recorded image is displayed as it is. The second pattern is setting to "fix the background image to the first image". When this pattern is set, the image corresponding to FIG. 3A is displayed. The third pattern is setting to "blur the image". When this pattern is set, an image obtained by blurring processing, mosaic processing, or the like is displayed for a region for which "0" is set to the time threshold value.

In the exemplary embodiment described above, the image composition unit 108 uses the background image updated by the background updating unit 106 to generate the protection image, but the background image used by the image composition unit 108 for generation of the protection image can be separately set.

FIG. 7 illustrates an example of a GUI for setting a background image. The CPU 201 of the image processing apparatus 101 reads a predetermined program from the RAM 203 and displays a window 700 on the display device 207.

A region 701 is a portion to allow setting of parameters related to the moving object detection unit 103 and the background updating unit 106. Here, a user can select either "ARBITRARY IMAGE" or "AUTOMATICALLY UPDATE" the above-described background image. When an arbitrary image is selected, a user presses a "SET" button to set an arbitrary image referring to a predetermined image file from the image processing apparatus 101 or an external apparatus. A thumbnail image of the set image is also displayed in the region 701.

On the other hand, when an option to "AUTOMATICALLY UPDATE" the background image is selected, a user can set whether to use the object detection unit 104 by switching the check box of "OPTION TO DETECT HUMAN BODY". In the example of FIG. 7, the option to detect human body is set to "OFF". Thus, the processing load for pattern matching is reduced accordingly. In addition, when an option to "AUTOMATICALLY UPDATE" the background image is set, a user can select whether the image acquisition unit 102 acquires an image from the "CAPTURED IMAGE" or acquires an image from the "RECORDED IMAGE". This allows selection of an image source when both the image capturing device 120 and the recording device 120 are present on the network 110 as illustrated in FIG. 1B. When the recording device 120 is selected, a user can specify a frame to be used in video data held by the recording device by start time and a length.

A region 702 is a portion to allow setting of a background image to be used by the image composition unit 108. In the region, there are provided a "SET" button for setting an arbitrary image file and a "SET LIVE IMAGE" button for directly setting a live image captured by the image capturing device 120 as a background image. A user can also make setting causing the image composition unit 108 to use the background image set in the region 701 as it is.

A region setting 703 is a portion to allow setting related to the background image to be automatically updated in a case where the automatically update option is selected in the region 701. When a "SET" button is pressed, the window 600 illustrated in FIG. 6 is displayed. In a region 704, a user can select a camera to which the setting made in the regions 701 to 703 is reflected. Even when there is a plurality of monitoring cameras on the network 110, similar setting can be made for the monitoring cameras easily. The portion labeled "FILE OUTPUT INTERVAL" allows setting of the interval at which the image composition unit 108 writes the image file (JPEG or HEIF) corresponding to the protection image to a predetermined portion of the external memory 204. The image composition unit 108 can store the image file in parallel with distribution of the protection image. The portion labeled "UPPER LIMIT OF NUMBER OF FILES" allows setting related to an upper limit of the number of image files to be held in the external memory 204, and an integer value between 1 and 60480 can be set. When the number of files reaches the upper limit, the oldest file is overwritten.

Further, in the above-described exemplary embodiment, a point of updating (overwriting) the time threshold value is not described, but the time threshold value can be updated at an interval longer than or equal to that of the detection timing by the moving object detection unit 103 or the object detection unit 104. For example, when the image output device 120 captures images of Full High Definition (HD) at 60 fps, the image acquisition unit 102 acquires captured images of Full HD at 10 fps and provides the acquired captured images to the moving object detection unit 103 and the object detection unit 104. The background updating unit 106 then performs processing to update the time threshold values in every frame of the captured images input at 10 fps at the time when the process starts. Specifically, the background updating unit 106 keeps an incremented score (stable background integration time) for a region where detection by the moving object detection unit 103 or the object detection unit 104 is similar to the previous frame. On the other hand, for a region where detection by the moving object detection unit 103 or the object detection unit 104 is different from the previous frame, the background updating unit 106 resets the incremented score to 0 and sets a new time threshold value based on the detection. The background updating unit 106 can update the time threshold value once in several frames to reduce the processing load. It is assumed that this processing is triggered by a user's specification or the fact that the moving object detection unit 103 or the object detection unit 104 has not detected, for a predetermined time, an object or a moving object having a certain area or more.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-018206, filed Feb. 5, 2018, which is hereby incorporated by reference herein in its entirety.

What is claimed is:

1. An image processing apparatus comprising a computer executing instructions that, when executed by the computer, cause the computer to function as:
    a detection unit configured to detect an object from a captured image by an image capturing unit;
    a setting unit configured to set a time threshold for a region corresponding to the object detected from the captured image, based on a feature of the object; and
    an updating unit configured to update a background image based on the captured image so that the object in the region in the captured image is reflected in the background image if a length of time during which the object is stationary in the region reaches the time threshold.

2. The image processing apparatus according to claim 1, wherein the detection unit detects the object from the captured image, by pattern matching based on a specific shape feature or a specific color.

3. The image processing apparatus according to claim 1, wherein the setting unit sets a first value as the time threshold for the region corresponding to the object if the object is a target privacy protection, and
    wherein the setting unit sets a second value, smaller than the first valued, as the time threshold for the region corresponding to the object if the object is not the target of privacy protection.

4. The image processing apparatus according to claim 3, wherein the target of privacy protection is person.

5. The image processing apparatus according to claim 1, further comprising a composition unit configured to generate a privacy protection image by composing an anonymized image with the background image updated by the updating unit, the anonymized image being for anonymizinq the target of privacy protection in the captured image.

6. The image processing apparatus according to claim 1, wherein the setting unit allows setting of a predetermined region of the input image to be always integrated with the background to set so as not to be the predetermined region of the input image as the target of privacy protection.

7. The image processing apparatus according to claim 1, wherein the setting unit allows setting of a predetermined region of the input image to never be integrated with the background to set so as to be the predetermined region of the input image as the target of privacy protection.

8. The image processing apparatus according to claim 7, wherein in a case where the predetermined region of the input image is set to never be integrated with the background, the setting unit allows setting to cause either the background image updated by the updating unit or the predetermined region of the input image on which blurring processing has been performed to be displayed.

9. The image processing apparatus according to claim 1, wherein the detection unit detects an object at a distance more than or equal to a specific distance as an object for which a degree of privacy protection is low.

10. An image processing method that updates a background image used for generating a privacy protected image in which a target of privacy protection is anonymized, the image processing method comprising:
    detecting an object from a captured image by an image capturing unit;
    setting time threshold for a region corresponding to the object detected from the captured image, based on a feature of the object; and
    updating the background image based on the captured image so that the object in the region in the captured image is reflected in the background image if a length of time during which the object is stationary in the region reaches the time threshold.

11. The image processing method according to claim 10, further comprising generating a privacy protection image by composing an anonymized image with the background image updated, the anonymized image being for anonymizing the target of privacy protection in the captured image.

12. A non-transitory computer readable storage medium storing a program for causing a computer to function as an image processing apparatus comprising:
    detection unit configured to detect an object from a captured image by an image capturing unit;
    a setting unit configured to set a time threshold for a region corresponding to the object detected from the captured image, based on a feature of the object; and
    an updating unit configured to update a background image based on the captured image so that the object in the region in the captured image is reflected in the background image if a length of time during which the object is stationary in the region reaches the time threshold.

* * * * *